Figure 1:
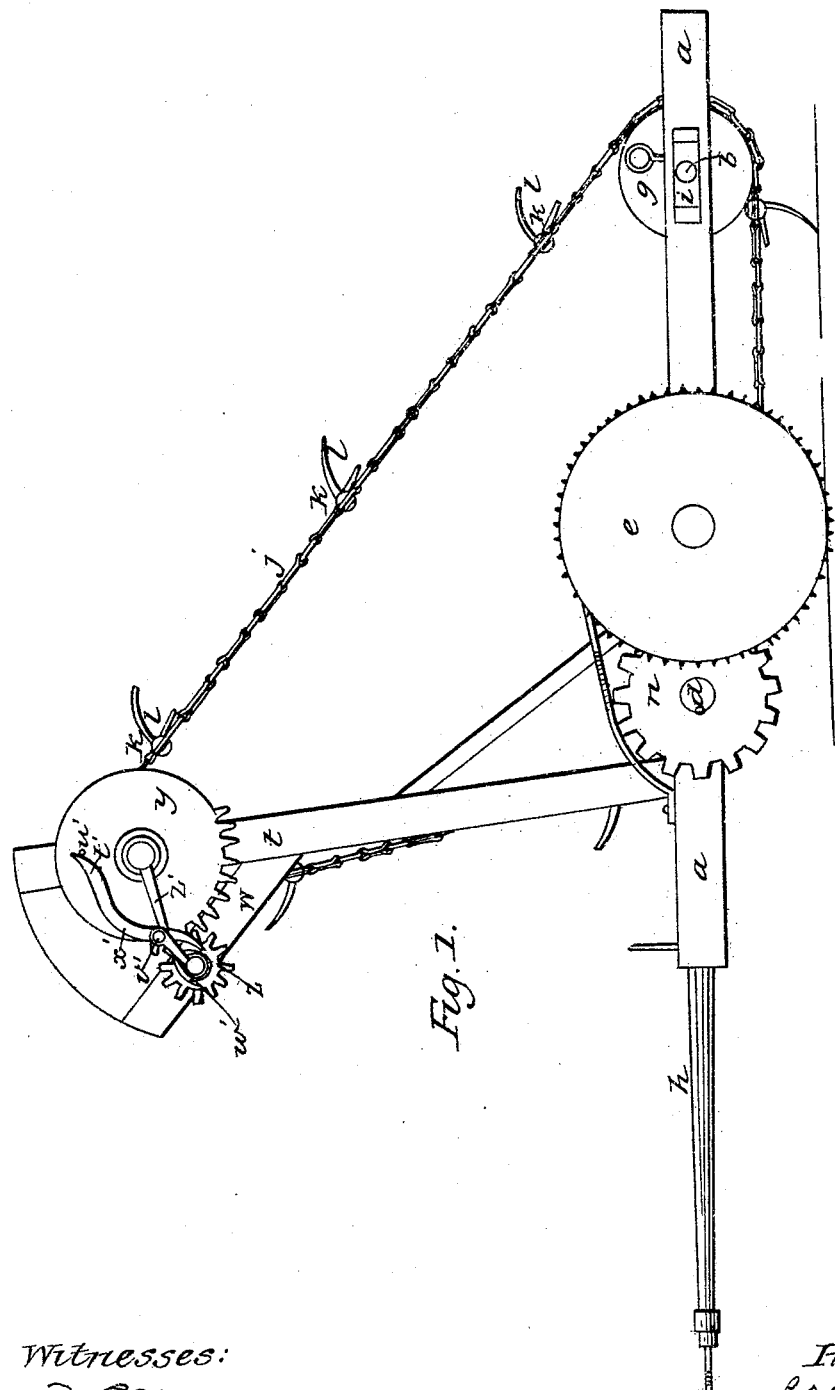

L. D. COPELAND.
Hay Raker and Loader.

2 Sheets—Sheet 1.

No. 69,187.

Patented Sept. 24, 1867.

Witnesses:

Inventor:
L. D. Copeland
by atty T. T. Everett

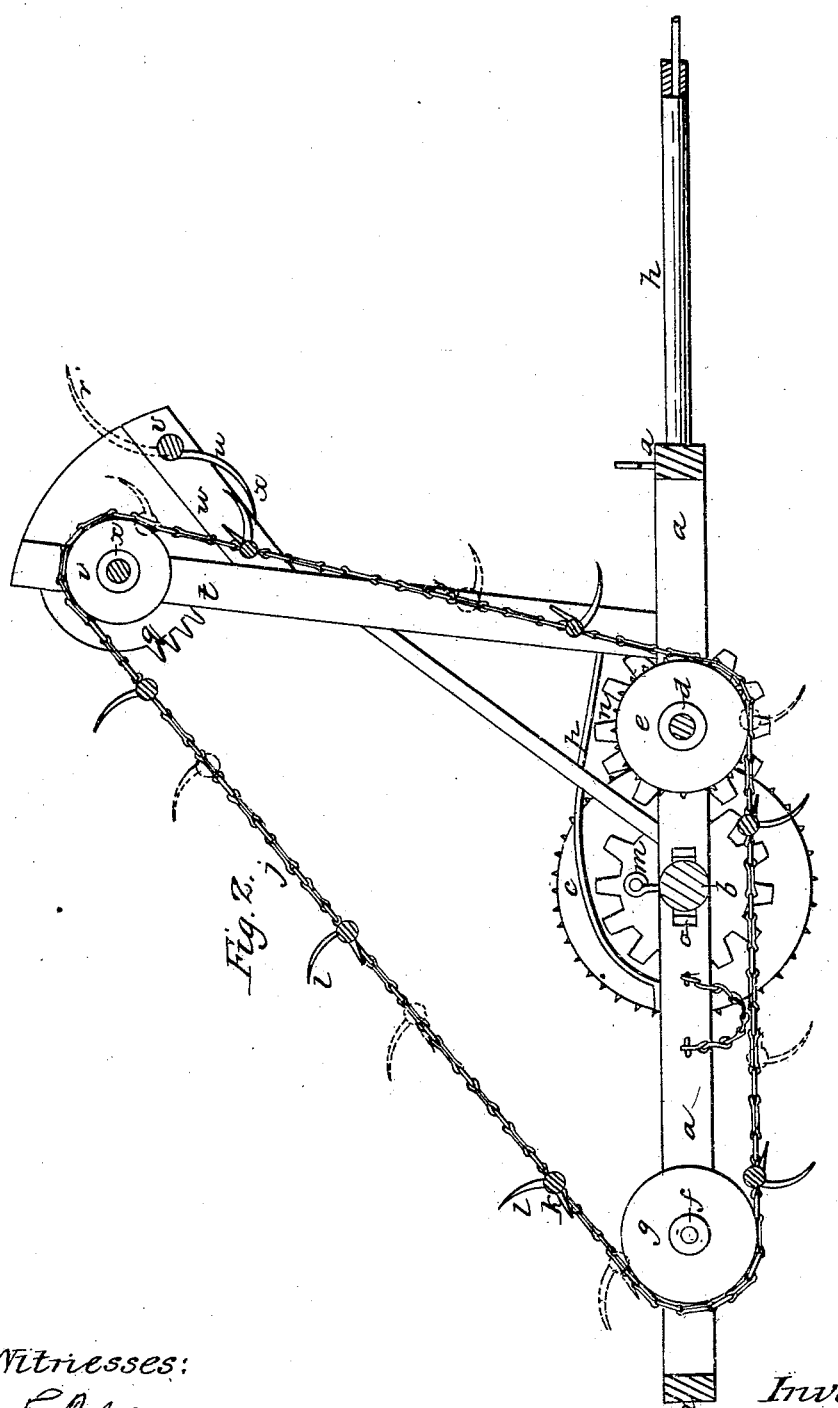

United States Patent Office.

LORENZO D. COPELAND, OF CHENANGO FORKS, NEW YORK.

*Letters Patent No. 69,187, dated September 24, 1867.*

IMPROVEMENT IN HAY-RAKERS AND LOADERS.

*The Schedule referred to in these Letters Patent and making part of the same.*

TO ALL WHOM IT MAY CONCERN:

Be it known that I, LORENZO D. COPELAND, of Chenango Forks, in the county of Broome, and State of New York, have invented a certain new and useful Raker and Pitcher, for raking and pitching hay and grain; and I do hereby declare that the following is a full, clear, and exact description of the construction and operation of the same, reference being had to the accompanying drawings, and to the letters and marks thereon.

My invention is so constructed and arranged that as a raker and pitcher it may be used in the field where the hay or grain has been cut, or it may be used as a stationary elevator and deliverer of hay or straw, it being operated in the one condition or position by the driving-wheel of the machine, and in the other position by any kind of motive power. The drawings forming part of this specification exhibit my invention—

Figure 1 thereof being a side view of the machine, and

Figure 2 being a view by longitudinal section, the machine being in a position reversed from that shown by fig. 1.

In each of these figures where like parts are shown like marks and letters are used to indicate the parts.

To suitable horizontal frame-bars $a$ are attached the axle or shaft $b$ of the driving-wheels $c$, the shaft $d$ of the forward band-wheels $e$, the shaft $f$ of the back band-wheels $g$, and the tongue or pole $h$. The bearings of the shaft $f$, marked $i$, are movable and adjustable, so that the endless chains $j$, carrying the shafts $k$ of the raking-teeth $l$, may be tightened or slacked, as may be required, to fit and adjust the rake-shaft, and for any other purpose needed. The driving-wheel $c$ has an inner toothed surface, $m$, that gears into the toothed wheel $n$ on the end of the shaft $d$, so that the shafts $d$ and $f$ and the parts affixed thereto are actuated by the driving-wheel through the toothed surface $m$ and toothed wheel $n$. The bearing $o$ of the wheel $c$ is also movable and adjustable, so that the connection between $m$ and $n$ may be broken. This allows of the machine being operated through and by the driving-wheel when the machine is drawn over the field or meadow, and operating on the hay or grain, or of its being drawn and not in operation, or of its being operated when stationary by proper gears connected to the toothed wheel $n$, derived from some motive power, and when these gears are used the guard $p$ may be elevated and put aside for the occasion. Both ends of the shaft $b$ may be in movable and adjustable bearings, though in many instances only the one end, as above recited, may be used. The band-wheels $e$ and $g$ are toothed, which teeth fit into the links of the endless chain or band $j$. The band-wheels $r$ on the shaft $s$ are also toothed for the same purpose. The shaft $s$ has its bearings in the vertical bars $t$, which bars may, instead of being vertical, have an inclination towards the front or towards the rear of the machine, as may best adapt the pitcher $u$ to the special position in which the machine may sometimes be used. The shaft $v$ of the pitcher has its bearings in the pieces $w$, extending out from the bars $t$. The teeth $x$ of the pitcher are longer than those of the rakers. On the end of the shaft $s$ is a wheel, $y$, that is rotated by this shaft, and toothed for a certain distance, as shown by fig. 1, which teeth fit into the pinion $z$ on the shaft $v$ of the pitcher. From the end of the one shaft to the other a small bar, $z'$, extends, to which is pivoted at $y'$ a pawl, $x'$. On the face of the pinion $z$ is a small extension, having a notch, $w'$, against which at certain periods the one end $v'$ of the pawl rests, to hold the pitcher in position, and on the face of the wheel $y$ is a pin, $u'$, that, as this wheel revolves, will elevate the end $t'$ of the pawl, and lift its other end from the notch $w'$.

The arrangements of the rakes and the pitcher in their relations to each other and the operation of the various parts of the machine are such that for every passage of a rake upwards there will be one revolution of the pitcher, the movement of the pitcher being so timed that the teeth of the pitcher pass under those of the rake, as indicated by fig. 2. Thus the pitcher will take from each passing rake its load of hay or grain, and pitch it over and deliver to such spot or such receiver as is provided for the reception of such hay or grain. This revolution of the pitcher is caused by the teeth of the wheel $y$ fitting into the pinion $z$ just as the pin $u'$ hits against the one end of the pawl and removes the other end from the notch $w'$, the wheel $y$ then carrying the pitcher around until it reaches the position indicated by the red lines $r'$ in fig. 2, when the teeth of the wheel pass out of those of the pinion, and the end of the pawl again comes into the notch $w'$ and holds the pitcher at rest.

What I claim as my invention, and desire to secure by Letters Patent, is—

1. The movable and adjustable bearing of the driving-wheel shaft, for adapting the machine to the different kinds of work, and for allowing the machine to be moved when not at work, as recited.

2. The toothed wheel $y$ and pinion $z$, with the pawl $x'$, for operating and controlling the pitcher, or the equivalents of those means for that purpose.

This specification signed this 27th day of March, 1867.

L. D. COPELAND.

Witnesses:
E. C. LEONARD,
R. R. CARR.